Sept. 7, 1926.  
J. E. EUBANK  
1,599,122  
PLUMB LEVEL AND TRANSIT COMBINATION  
Filed Sept. 17, 1923
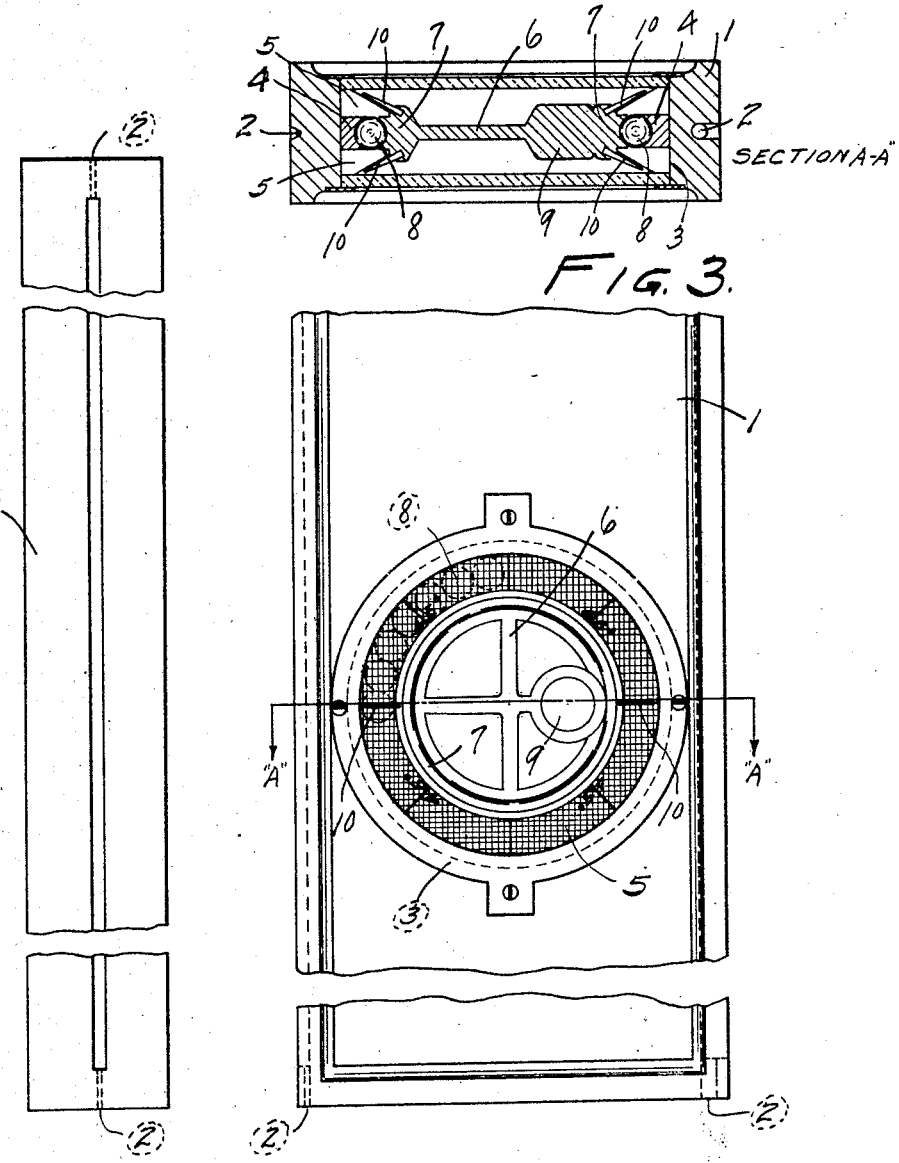
INVENTOR  
Josiah E. Eubank  
BY  
Adam E. Fisher.  
ATTORNEY Patented Sept. 7, 1926.

1,599,122

UNITED STATES PATENT OFFICE.

JOSIAH E. EUBANK, OF NEW YORK, N. Y.

PLUMB LEVEL AND TRANSIT COMBINATION.

Application filed September 17, 1923. Serial No. 663,047.

This invention is a combination plumb level and transit, and the object is to provide a simple and practical instrument of this character for the use of mechanics.

In the drawing—

Figure 1 is a side elevation of the instrument;

Figure 2 is a top plan view;

Figure 3 is a cross sectional view on line A—A of Figure 1.

The invention consists of a rectangular bar 1, made of wood or any other suitable material, and having a bore 2 (pierced through the bar from end to end along each edge thereof,) to serve as "peep-holes" for aligning the instrument with distant objects. Transversely through the center of the bar 1 is cut a circular hole 3, the diameter of which is slightly less than the distance between the axes of the peep holes 2, adapted to serve as a housing for the working elements of the instrument. Within this hole is mounted an annular ball race 4, inclosed at each side by an annular celluloid facing, or calibration ring 5, each having outer faces inclined inwardly, as shown. Any desired system of markings or calibrations may be represented upon these rings 5. Balls 8 are placed within the race 4, and a plumb wheel 6, having a concaved periphery 7 to adapt it for the proper seating and to hold it in place, is mounted upon the balls 8. The wheel 6 is loaded with a plumb weight 9 located on one side of the wheel, and which normally turns to the bottom because of its weight. Indicators 10 are mounted on each side of the wheel at opposite points and extended out over the rings 5, four of these indicators, two diametrically positioned on each side of the wheel, being located (as shown immediately under the weight 9.)

This instrument may be readily adapted for use as a plumb or as a level, since the weight 9 will of course seek its lowest gravational point and the indicators 10 will show the degrees of inclination from the perpendicular or horizontal upon the calibrated rings 5. The instrument may be sighted through either of the peep holes 2, and with either edge of the instrument uppermost, thus making it adaptable for use as a sort of transit.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:—

A device of the kind described, comprising a rectangular bar having a bore (as shown pierced therethrough from end to end along each edge) and having a central, transverse, circular housing hole cut therethrough; an annular ball race mounted within the periphery of the hole; annular facings for the sides of the ball race, the same having suitable markings thereon; balls mounted in the race; a weighted plumb wheel riding on the said balls; and indicators extended from the wheel out over the said facings.

In testimony whereof I affix my signature.

JOSIAH E. EUBANK.